United States Patent Office 3,471,164
Patented Oct. 7, 1969

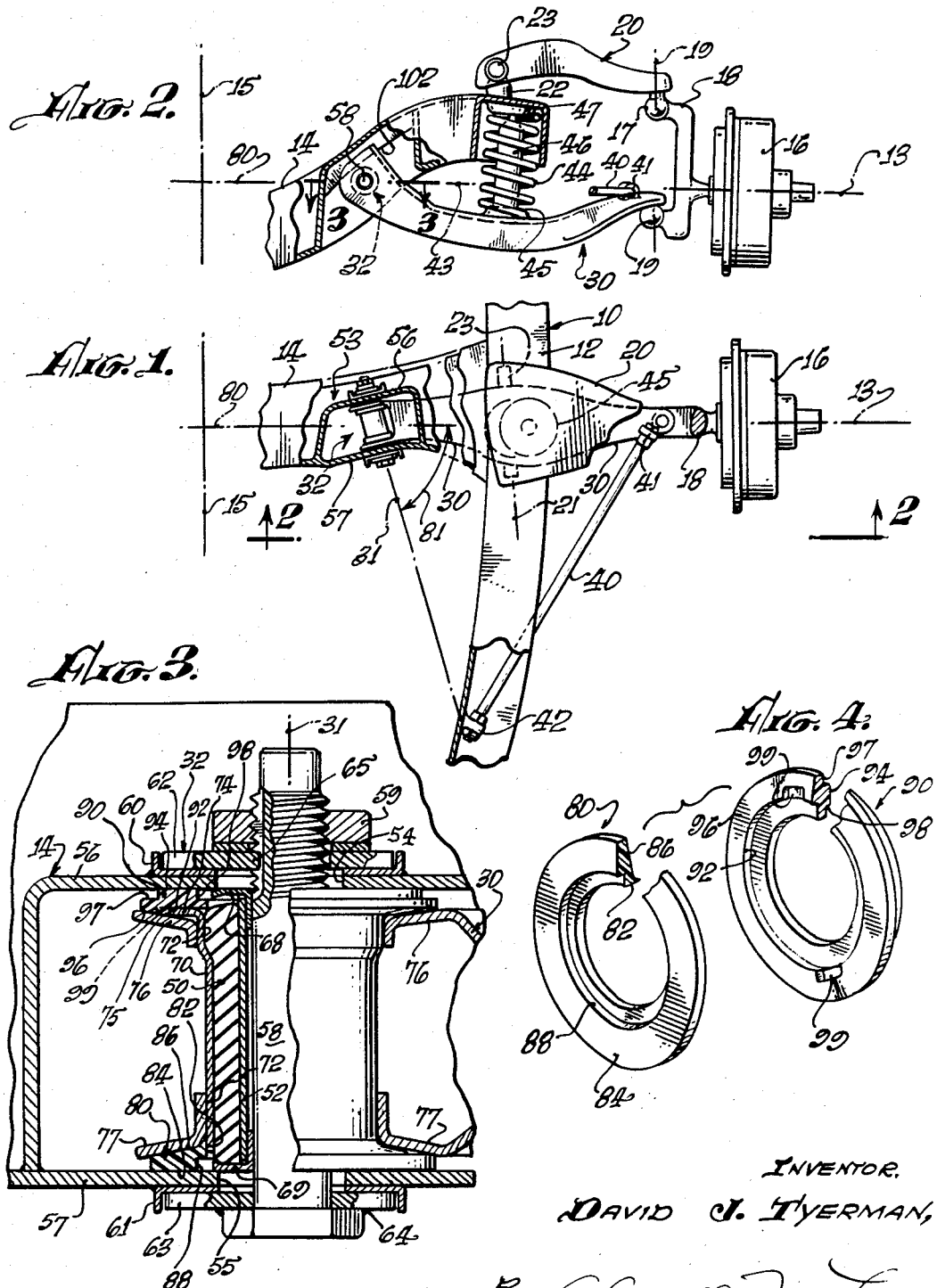

3,471,164
BUSHING CENTRALIZER FOR AUTOMOBILE
FRONT WHEEL SUSPENSION
David J. Tyerman, 9446 Whitaker,
Sepulveda, Calif. 91343
Filed Sept. 18, 1967, Ser. No. 668,454
Int. Cl. B62d; B60g; B60p
U.S. Cl. 280—96.2
3 Claims

ABSTRACT OF THE DISCLOSURE

The life and performance of the conventional individual front wheel suspension for certain automobiles are improved by stabilizing the lower control arm inner bushing against relative axial movement of the inner and outer metal sleeves between which the annular rubber bushing is contained. That is accomplished by insertion of specially shaped spacing rings at both ends of the bushing.

---

This invention has to do generally with suspension mechanisms for the front wheels of automobiles in which the two front wheels are independently mounted and sprung. More particularly, the invention concerns an improvement in the existing front wheel suspension of a particular type, which is typically represented by that employed in Chevrolet automobiles produced in the years 1965 to 1967.

A primary purpose of the invention is to prolong the effective life of the rubber bushing on which the lower control arm of such suspension mechanisms is pivotally mounted on the automobile frame. This resulting improvement of the life of the bushing will maintain correct alignment of the wheels and prolong tire life.

The control arm bushing is enclosed between inner and outer sleeves, and is normally subject to severe stresses due to relative axial movement of the two sleeves. I have discovered that such axial movement can be prevented, and the life and performance of the bushing markedly improved, by insertion of suitably formed and dimensioned spacer members at the ends of the bushing. Spacers constructed in accordance with the invention provide effective axial definition but do not interfere with the various rotary degrees of freedom required of the control arm.

A full understanding of the invention and of its further objects and advantages will be had from the following description of an illustrative manner in which the invention can be carried out. The particulars of that description, and of the drawings which form a part of it, are intended only as illustration and not as a limitation upon the scope of the invention.

In the drawings:

FIG. 1 is a fragmentary plan, partially broken away, representing schematically a left front wheel suspension mechanism of the type to which the invention particularly pertains;

FIG. 2 is a section on line 2—2 of FIG. 1;

FIG. 3 is a section on line 3—3 of FIG. 2 at enlarged scale, representing an inner lower control bushing embodying the invention; and FIG. 4 is a view showing annular spacer members used with the bushing.

The invention will best be understood by describing first the conventional structure of the particular type of front wheel suspension to which the invention pertains. In FIGS. 1 and 2 a portion of the main automobile frame is represented at 10, including the left longitudinal frame member 12 and the transverse frame member 14. The central longitudinal vertical plane of the vehicle is indicated at 15. Structural details and parts not involved in the present invention are simplified or omitted for clarity of illustration.

The left front wheel 16 is journaled on the wheel spindle on axis 13 on the spindle support arm 18. That arm is mounted at its upper and lower ends on the axis 19 by the ball joints 17 and 19, which are carried by the free outer ends of the respective upper and lower control arms 20 and 30. The inner end of upper control arm 20 is pivotally mounted on the axis 21 by means of the two pivot bearings 23, supported by the brackets 22 on longitudinal frame member 12. Lower control arm 30 is mounted at its inner end on transverse frame member 14 by means of bushing structure 32, with which the present invention is more particularly concerned. That bushing structure permits essentially free arm rotation through a limited angle about bushing axis 31. Swinging movement of arm 30 in the plane of FIG. 1 is substantially prevented by the strut rod 40, which extends forwardly from the free end of the arm at 41 to an anchor 42 on longitudinal frame member 12. However, due to the compliant nature of the rubber mounting at the front end of strut rod 40, lower control arm 30 is permitted slight fore and aft swinging movement in the plane of axis 31 and the strut rod. That plane is represented at 43 in FIG. 2. Bushing structure 32 must accommodate that slight movement as well as the relatively free rotation of the arm about axis 31 and the slight radial movement allowed by the compliant nature of the rubber part of the bushing.

The car weight is transferred to wheel 16 by the coil spring 44, which is seated at its lower end on a spring seat 45 formed in the upper surface of control arm 30. The upper end of spring 44 engages a seat 47 fixed on longitudinal frame member 12 below upper control arm 20. A shock absorber 46 is typically mounted coaxially within spring 44, interconnecting the main frame and the lower control arm.

Bushing structure 32, shown best in FIG. 3, conventionally comprises the annular rubber bushing 50 which is enclosed between the inner bushing sleeve 52 and the outer bushing sleeve 70. Inner sleeve 52 is rigidly but adjustably mounted on axis 31 on transverse frame member 14 by the bolt 58, which is received in the horizontally slotted holes 54 and 55 in the respective sidewalls 56 and 57 of the frame box structure 53. The washers 68 and 69, with inner locating flanges received between the bolt and sleeve 52, provide increased bearing surfaces by which the ends of the sleeve are seated on sidewalls 56 and 57, bridging the slotted holes. The camber of wheel 16 is adjustable by shifting bolt 58 horizontally in the holes 54 and 55. To facilitate that adjustment, bolt 58 carries two eccentric circular cams 62 and 63 each of which works between two generally vertical parallel guide tracks 60 and 61, fixedly mounted on the outer faces of frame walls 56 and 57. Cam 63 is welded to bolt 58 at 64, and cam 62 is keyed to the bolt at 65. After rotational adjustment of the bolt, nut 59 is tightened, clamping inner sleeve 52 rigidly between frame sidewalls 56 and 57.

Outer bushing sleeve 70 is mounted in semi-permanent manner, as by a press fit, in a transverse bore 72 in lower control arm 30. That bore consists of alined holes in the two side flanges of the arm. Those flanges are slightly conically deformed coaxially of bore 72, and are formed to increase the support surface for sleeve 70. To facilitate assembly, the diameter of the hole in the rear flange 76 is slightly larger than in the forward flange 77, and sleeve 70 is enlarged correspondingly at its rear end. The axial position of sleeve 70 in arm 30 is defined by the flange 74 at the rear end of the sleeve. After assembly, that flange is sometimes spot-welded to the outer surface of arm 30 as indicated at 75.

In the normal construction of bushing structure 32, the spacing between sidewalls 56 and 57 of frame member 14 is sufficient to provide clearance between those walls and control arm 30, thus accommodating the slight swinging movement of the arm in the axial plane of strut rod 40, already described. Excessive axial translational movement of arm 30, such as might cause contact of the arm with frame sidewalls 56 and 57, is normally prevented by the shear strength of bushing 50. However, it has been found in practice that the axial forces on arm 30 tend to exceed that shear strength so that, particularly after deterioration of the rubber bushing, metal to metal contact between arm 30 and one or other of the frame sidewalls 56 and 57 may occur.

That condition is promoted by the fact that bushing axis 31 is not perpendicular to the longitudinal axis of control arm 30, indicated at 80 in FIG. 1. Because of the oblique angle 81, longitudinal forces imposed on the arm from wheel 16 have an appreciable component parallel to axis 31. In particular, the weight of the car, while standing or during normal operation, exerts a counterclockwise torque on spindle structure 18 as seen in FIG. 2, thereby exerting upon lower control arm 30 a longitudinal force to the right. The component of that force parallel to bushing axis 31 is directed forwardly, and therefore tends to shift outer sleeve 70 forward relative to inner sleeve 52. On the other hand, when wheel 16 is braked, strut rod 40 is subjected to tension, exerting on control arm 30 a longitudinal force to the left as seen in FIG. 1. The component of that force parallel to bushing axis 31 is directed rearwardly, and therefore tends to translate outer bushing sleeve 70 to the rear relative to inner sleeve 52. Accordingly, the rubber of bushing 50 is subjected to axial shear alternately in opposite directions. These forces cause longitudinal motion in the outer sleeve 70 even when the rubber is new and allows immediate and substantial variations in the alignment of the wheels; plus causing eventual and premature failure of the rubber part of the bushing. Control arm 30 then tends to contact one or both of the sidewalls 56 and 57, producing intermittent noise and affecting both the steering and riding qualities of the car when the bushing moves off center, as well as causing excessive misalignment and resulting tire wear.

In accordance with the present invention those and other difficulties are overcome by positively preventing any appreciable relative axial movement of the two bushing sleeves 52 and 70. That is accomplished by inserting annular spacing members at both ends of outer bushing sleeve 70 between control arm 30 and the respective frame sidewalls 56 and 57. As illustratively shown in FIG. 3, the spacer 80 at the forward end of the bushing is positively positioned radially by engagement of its inner periphery 82 with the outer surface of bushing sleeve 70. The axially outer face 84 of spacer 80 is substantially plane and flatly engages the inner surface of frame sidewall 57. The axially inner face 86 of the spacer is slightly conical and seats firmly on control arm flange 77. Inner periphery 82 of spacer 80 is cut away at 88 to provide ample clearance for washer 69 in case of severe radial distortion of the rubber bushing.

Spacer 90 at the rearward end of the bushing assembly has a substantially plane axially outer face 94 and a slightly conical inner face 96, which firmly engage sidewall 56 and control arm flange 76, respectively. Spacer 90 is relieved at 98 to clear washer 68, as already described for spacer 80. Radial definition of spacer 90 is obtained at its cylindrical surface 92, which engages the radially outer edge of flange 74 of sleeve 70. Despite the small axial width of that surface, it has been found fully adequate for maintaining the spacer coaxial with sleeve 70 during mutual radial movement of the two sleeves 52 and 70. Both spacers slide freely over the frame walls 56 and 57 when the suspension is adjusted for camber. Relatively narrow recesses 99 are provided in the axially inner face 96 of spacer 90 at suitable angular positions to clear the spot-welds 75 on those installations where such spot-welds are used. The outer periphery of spacer 90 is preferably cut away at 97 to clear the offset 102 that normally occurs in the face of sidewall 56 due to the usual construction of frame box 53 (FIG. 2).

It has been found that insertion of annular spacers of the general form just described does not unduly limit relative movement of lower control arm 30 relative to the car frame. However, to insure freedom for such movement, and to prevent wear of either the spacers or the surfaces which they engage, one or both axial faces of each spacer element should be formed of a material having suitable anti-friction or self-lubricating properties. That objective is most readily attained by forming the entire spacer unit of a suitable polymerized resinous material that has a notably low coefficient of friction with respect to metal. A particularly satisfactory material for that purpose is a structural synthetic acetal resin polymer formed by polymerization of formaldehyde in hexane, such, for example, as that which is available commercially under the trade name Delrin. That material is dimensionally very stable and is sufficiently hard to withstand abrasion in the described service. It can be accurately dimensioned to provide effectively positive axial definition of control arm 30, and its low coefficient of friction avoids significant restriction of the necessary movements of the control arm,

I claim:

1. In combination with an individual front wheel suspension mechanism for an automobile having a frame, which suspension mechanism comprises upper and lower control arms pivotally mounted on the frame on respective generally parallel pivot axes, spindle support structure mounted at its upper and lower ends on the free ends of the respective control arms for limited universal pivotal movement, means journaling the wheel on said spindle support structure, and a generally vertical coil spring having its ends seated on the frame and on the lower control arm, respectively, said pivotal mounting of the lower control arm on the frame comprising an annular bushing of rubberlike material between coaxial inner and outer sleeves, the inner sleeve being rigidly mounted on the frame and the outer sleeve being rigidly mounted in a transverse bore in the lower control arm with its ends extending beyond the sidewalls of the control arm and axially spaced from the frame, said bore being non-perpendicular to the longitudinal axis of the control arm whereby longitudinal forces exerted on the control arm by the wheel normally cause axial distortion of the bushing; the improvement which comprises:

a pair of annular spacer members of a size and form to be received at opposite ends of the bushing between the control arm and the frame, and defining structure acting to position the spacer members coaxially with respect to the outer sleeve, each spacer member having opposite axial faces formed and mutually spaced to simultaneously engage the frame and the control arm, respectively, to substantially prevent relative axial movement thereof while permitting substantially free relative angular movement and limited relative radial movement thereof with respect to the bushing axis and permitting limited relative angular movement thereof parallel to that axis.

2. The combination defined in claim 1, and in which said defining structure comprises an inner generally cylindrical surface on each spacer member engaging the outer sleeve of the bushing to define the radial position of the spacer member with respect to that outer sleeve.

3. The combination defined in claim 1, and in which each spacer member consists essentially of a unitary body of polymerized acetal resin produced by polymerization of formaldehyde in hexane.

References Cited
UNITED STATES PATENTS

| | | | |
|---|---|---|---|
| 2,757,017 | 7/1956 | Matthias et al. | 280—124 |
| 3,000,657 | 9/1961 | Boschiet et al. | 287—85 |
| 3,039,831 | 6/1962 | Thomas | 287—85 X |
| 3,107,949 | 10/1963 | Moskovitz. | |
| 3,130,991 | 4/1964 | Piragino | 308—238 X |
| 3,237,962 | 3/1966 | Kraus et al. | 280—96.2 |

KENNETH H. BETTS, Primary Examiner

U.S. Cl. X.R.

308—26, 163, 238